US006660357B1

United States Patent
Litvinov et al.

(10) Patent No.: US 6,660,357 B1
(45) Date of Patent: Dec. 9, 2003

(54) PERPENDICULAR MAGNETIC RECORDING MEDIA WITH LAMINATED SOFT MAGNETIC UNDERLAYER

(75) Inventors: Dmitri Litvinov, Pittsburgh, PA (US); Sakhrat Khizroev, Pittsburgh, PA (US); James Kent Howard, Pittsburgh, PA (US); Roy Wallace Gustafson, Boxboro, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 09/776,061

(22) Filed: Feb. 2, 2001

Related U.S. Application Data

(60) Provisional application No. 60/249,072, filed on Nov. 14, 2000, and provisional application No. 60/180,415, filed on Feb. 4, 2000.

(51) Int. Cl.[7] .................................................. G11B 5/66
(52) U.S. Cl. ...................... 428/65.3; 428/336; 428/611; 428/694 TM; 428/694 TR; 428/394 TS; 428/900; 427/128; 427/129; 427/130; 427/131; 360/113; 360/135
(58) Field of Search .................. 428/694 TM, 694 TR, 428/694 TS, 336, 900; 360/65.3, 611, 113, 135; 427/128–131

(56) References Cited

U.S. PATENT DOCUMENTS

| 4,410,603 A | 10/1983 | Yamamori et al. |
| 4,438,471 A | 3/1984 | Oshiki et al. |
| 4,541,026 A | 9/1985 | Bonin et al. |
| 4,546,398 A | 10/1985 | Toda et al. |
| 4,575,777 A | 3/1986 | Hosokawa |
| 4,613,918 A | 9/1986 | Kanai et al. |
| 4,629,660 A | 12/1986 | Sagoi et al. |
| 4,649,449 A | 3/1987 | Sawada et al. |
| 4,731,157 A | 3/1988 | Lazzari |
| 4,974,110 A | 11/1990 | Kanamine et al. |
| 5,447,781 A | 9/1995 | Kano et al. |
| 5,738,927 A | 4/1998 | Nakamura et al. |
| 5,763,108 A | 6/1998 | Chang et al. |
| 5,830,569 A | 11/1998 | Hikosaka et al. |
| 5,846,598 A | 12/1998 | Semkow et al. |
| 5,895,712 A | 4/1999 | Chen et al. |
| 5,900,324 A * | 5/1999 | Moroishi et al. ........... 428/611 |
| 5,907,790 A | 5/1999 | Kellam |
| 5,942,342 A | 8/1999 | Hikosaka et al. |
| 6,001,447 A | 12/1999 | Tanahashi et al. |
| 6,090,480 A * | 7/2000 | Hayashi ..................... 428/332 |
| 6,094,328 A | 7/2000 | Saito |
| 6,228,515 B1 | 5/2001 | Shin et al. |
| 6,261,681 B1 | 7/2001 | Suekane et al. |
| 6,270,885 B1 * | 8/2001 | Hokkyo et al. ............. 428/332 |
| 6,395,413 B1 | 5/2002 | Ando |
| 6,531,202 B1 * | 3/2003 | Litvinov et al. ........... 428/65.3 |

FOREIGN PATENT DOCUMENTS

| JP | 401128226 | 5/1989 |
| JP | 408045068 | 2/1996 |

OTHER PUBLICATIONS

Ando et al., "Triple–Layer Perpendicular Recording Media for High SN Ratio and Signal Stability", *IEEE Transacitons on Magnetics*, Sep. 1997, pp. 2983–2985, vol. 33, No. 5.

* cited by examiner

*Primary Examiner*—Leszek Kiliman
(74) *Attorney, Agent, or Firm*—Alan G. Towner, Esq.; Pietragallo, Bosick & Gordon

(57) ABSTRACT

Magnetic recording media having a biased soft magnetic underlayer are disclosed. The soft magnetic underlayer includes at least two soft magnetic layers separated by a thin non-magnetic layer. Magnetostatic coupling between the soft magnetic layers causes the magnetizations in the layer to be anti-parallel. The biased soft magnetic underlayer is brought into a substantially single-domain state, thereby reducing or eliminating unwanted noise in the soft underlayer. In a preferred embodiment, the recording media includes a perpendicular magnetic recording disk.

20 Claims, 2 Drawing Sheets

PERPENDICULAR MAGNETIC RECORDING MEDIA WITH LAMINATED SOFT MAGNETIC UNDERLAYER

CROSS REFERENCE TO RELATED APPLICATION

This application claims the benefit of U.S. Provisional Patent Application Ser. No. 60/180,415 filed Feb. 4, 2000 and No. 60/249,072 filed Nov. 14, 2000.

FIELD OF THE INVENTION

The present invention relates to perpendicular magnetic recording media, and more particularly relates to media in which noise is suppressed through the use of a laminated soft magnetic underlayer. The lamination controls the magnetic domain structure of the soft underlayer.

BACKGROUND INFORMATION

Perpendicular magnetic recording systems have been developed for use in computer hard disk drives. An approach to perpendicular magnetic recording requires the use of recording media with a magnetically soft underlayer which provides a flux path from the trailing write pole to the leading return pole of the writer. The soft underlayer enables substantially stronger fields than can be generated with a ring head in conventional longitudinal recording systems. The soft underlayer also provides sharper field gradients which enable writing on high coercivity media. In addition, the soft underlayer helps during the read operation. During the read back process, the soft underlayer produces the image of magnetic charges in the magnetically hard layer, effectively increasing the magnetic flux coming from the media. This provides a higher playback signal.

One of the challenges of implementing perpendicular recording is to resolve the problem of soft underlayer noise. The noise is caused by fringing fields generated by magnetic domains, or uncompensated magnetic charges, in the soft underlayer that can be sensed by the reader. For the write process to be efficient, high moment materials, e.g., $B_s > 20$ kG, may be used for the soft underlayer. If the magnetic domain distribution of such materials is not carefully controlled, very large fringing fields can introduce substantial amounts of noise in the read element. Not only can the reader sense the steady-state distribution of magnetization in the soft underlayer, but it can also affect the distribution of magnetization in the soft underlayer, thus generating time-dependent noise. Both types of noise should be minimized.

The present invention has been developed in view of the foregoing, and to address other deficiencies of the prior art.

SUMMARY OF THE INVENTION

The present invention provides perpendicular magnetic recording media having a laminated soft magnetic underlayer which includes multiple layers that generate opposed magnetic fields in the soft magnetic underlayer. The laminated soft magnetic underlayer may be brought into a substantially single-domain state by the magnetic fields. Reducing or eliminating multiple domains addresses the noise problem noted above. In one embodiment, the magnetization is aligned radially in a direction substantially perpendicular to the recording tracks of a disk in order to reduce or eliminate local domain walls in the soft underlayer. It is noted that a "single-domain" state is an approximation, which applies to materials without any magnetic defects. In actual magnetic films, the film may be magnetically saturated in accordance with the present invention in order to sufficiently reduce the number of domain walls, thus suppressing soft underlayer noise.

An aspect of the present invention is to provide a perpendicular magnetic recording medium including a hard magnetic recording layer and a soft magnetic underlayer. The underlayer comprises means for generating a noise-reducing magnetic field in the soft magnetic underlayer.

Another aspect of the present invention is to provide a laminated soft magnetic underlayer of a perpendicular magnetic recording medium. The laminated soft magnetic underlayer comprises first and second layers of magnetically soft material separated by a non-magnetic spacer layer.

A further aspect of the present invention is to provide a method of making a magnetically soft underlayer of a perpendicular magnetic recording disk. The method includes the steps of depositing a first magnetically soft layer on a substrate disk, depositing a non-magnetic spacer layer on the first magnetically soft layer, and depositing a second magnetically soft layer on the non-magnetic spacer layer. The arrangement of the magnetically soft layers and the non-magnetic spacer layer generates opposed magnetic fields in the soft magnetic underlayer.

These and other aspects of the present invention will be more apparent from the following description.

DETAILED DESCRIPTION

The present invention provides a laminated soft magnetic underlayer of a magnetic recording media. The laminated soft magnetic underlayer is characterized by an opposed magnetic field which effectively reduces or eliminates noise from the underlayer. For example, the laminated soft magnetic underlayer of a perpendicular magnetic recording disk may be radially biased. In one embodiment, two thin films of a soft magnetic material are separated by a thin non-magnetic spacer layer. If the thickness of the non-magnetic spacer layer is sufficient to exchange decouple the two magnetic layers due to magnetostatic coupling, the magnetizations in the two films will be aligned anti-parallel to minimize the magnetostatic energy. The soft underlayer may be deposited, for example, on a disk substrate as two soft magnetic layers separated by a thin non-magnetic spacer layer. To minimize the magnetostatic energy, the magnetization in the top and in the bottom layers will have opposite directions, i.e., the soft underlayer will be biased radially.

Figure 1:
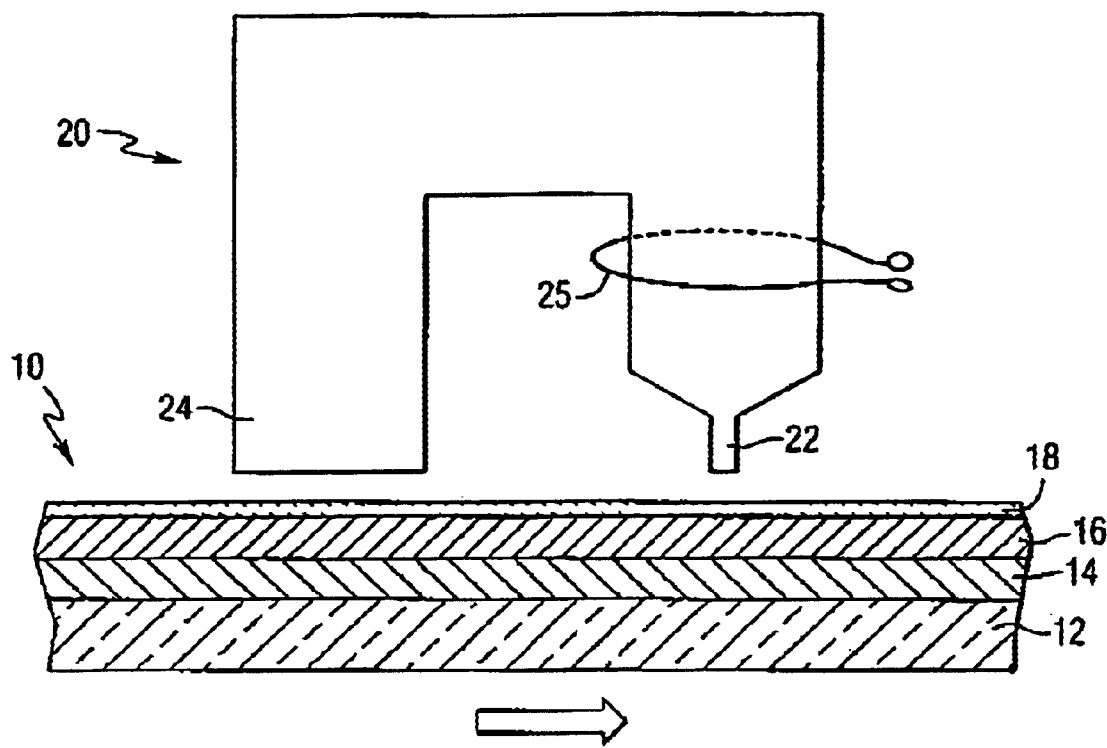
FIG. 1 is a partially schematic side view of a perpendicular recording head and a perpendicular recording medium which may incorporate a reduced-noise soft magnetic underlayer in accordance with an embodiment of the present invention.

FIG. 1 is a partially schematic side sectional view of a perpendicular magnetic recording medium 10. The medium 10 includes a substrate 12, which may be made of any suitable material such as ceramic glass, amorphous glass or NiP plated AlMg. A magnetically soft underlayer 14 is deposited on the substrate 12. A magnetically hard recording layer 16 is deposited on the soft underlayer 14. Suitable hard magnetic materials for the recording layer 16 include multilayers of Co/Pd or Co/Pt, L10 phases of CoPt, FePt, CoPd and FePd and hcp Co alloys, with such multilayers and L10 phases being typical hard materials. A protective overcoat 18 such as diamond-like carbon may be applied over the recording layer 16.

FIG. 1 also illustrates a perpendicular recording head 20 positioned above the magnetic recording medium 10. The recording head 20 includes a main pole 22 and an opposing pole 24. An electrically conductive magnetization coil 25 surrounds a yoke of the main pole 22. During recording operations, current applied to the magnetization coil 25 induces a magnetic flux which is directed from the main pole 22 perpendicularly through the recording layer 16, then in the plane of the soft underlayer 14 back to the opposing pole 24.

Figure 2:
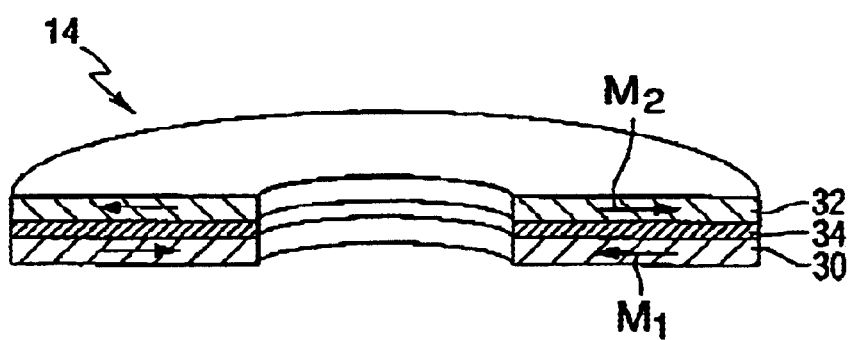
FIG. 2 is a partially schematic sectional perspective view of a laminated soft magnetic underlayer of a perpendicular recording disk, illustrating opposed radial magnetic fields that are generated through the magnetically soft layers of the underlayer in accordance with an embodiment of the present invention.

FIG. 2 is a partially schematic sectional perspective view of a laminated soft magnetic underlayer 14 of a perpendicular magnetic recording disk. For purposes of clarity, the thicknesses of the layers of the magnetic underlayer 14 are not drawn to scale. The laminated soft magnetic underlayer 14 includes a first magnetically soft layer 30 and a second magnetically soft layer 32. A thin non-magnetic spacer layer 34 separates the first and second magnetically soft layers 30 and 32. The non-magnetic spacer layer 34 exchange decouples the first and second soft magnetic layers 30 and 32. As a result of magnetostatic coupling, magnetizations $M_1$ and $M_2$ in the first and second magnetically soft layers 30 and 32 are aligned anti-parallel. Although two soft magnetic layers 30 and 32 are shown in FIG. 2, additional soft magnetic layers separated by additional non-magnetic spacer layers may be used. Thus, from two to twenty or more soft magnetic layers may be provided in the laminated soft underlayer.

Suitable soft magnetic materials for the first and second magnetically soft layers 30 and 32 of the underlayer 14 include CoFe and alloys thereof, FeAlN, NiFe, CoZrNb, CoNiFe, FeTaN and alloys thereof, with FeAlN, NiFe, CoFe and alloys thereof being typical soft materials. The layers 30 and 32 may be made of the same or different materials. The thickness of each layer 30 and 32 may range from about 5 to 100 nm, typically from about 10 to 50 nm.

Suitable materials for the non-magnetic spacer layer 34 include oxides such as $SiO_2$ and MgO, nitrides such as BN and CN, carbides such as $B_4C$ and SiC, and metals and alloys such as Ta, Cu, Au and the like. The thickness of the non-magnetic spacer layer 34 may range from about 0.5 to 20 nm, typically from about 1 to 10 nm.

Figure 3:
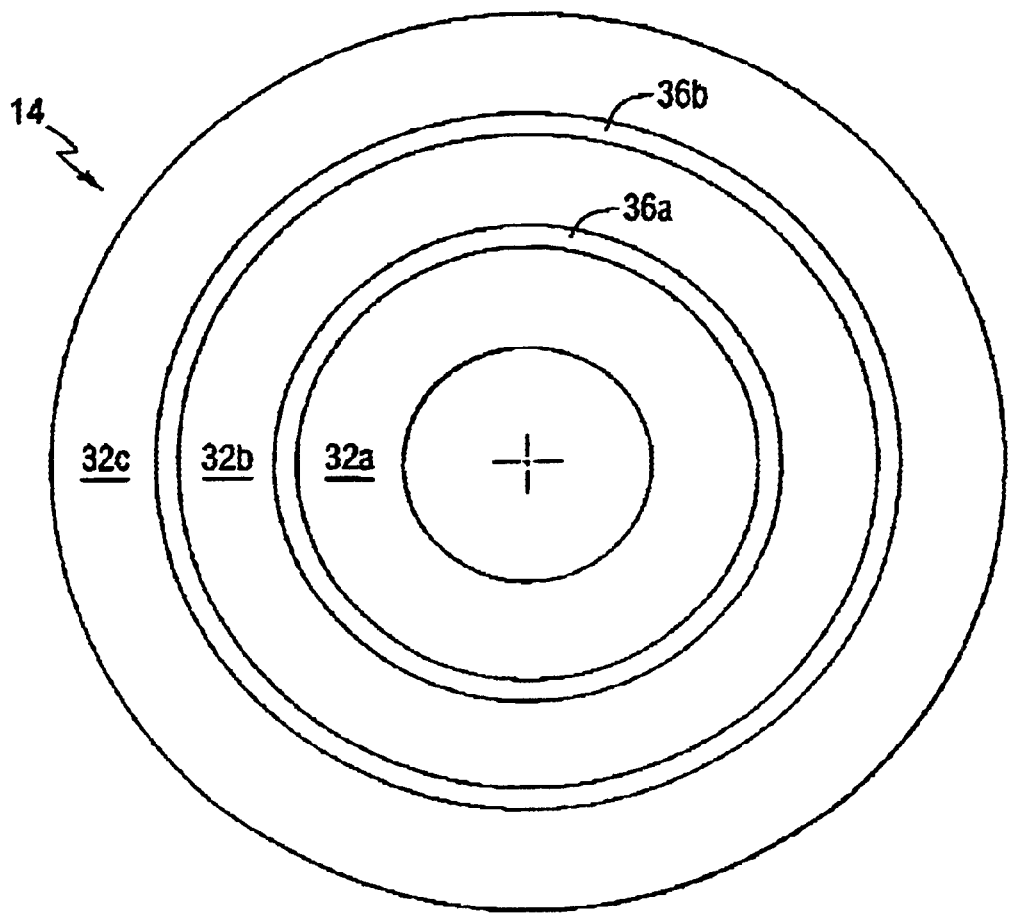
FIG. 3 is a partially schematic top view of a laminated magnetically soft underlayer of a perpendicular recording disk, illustrating concentric rings of magnetically soft material separated by non-magnetic bands in accordance with an embodiment of the present invention.
Figure 4:
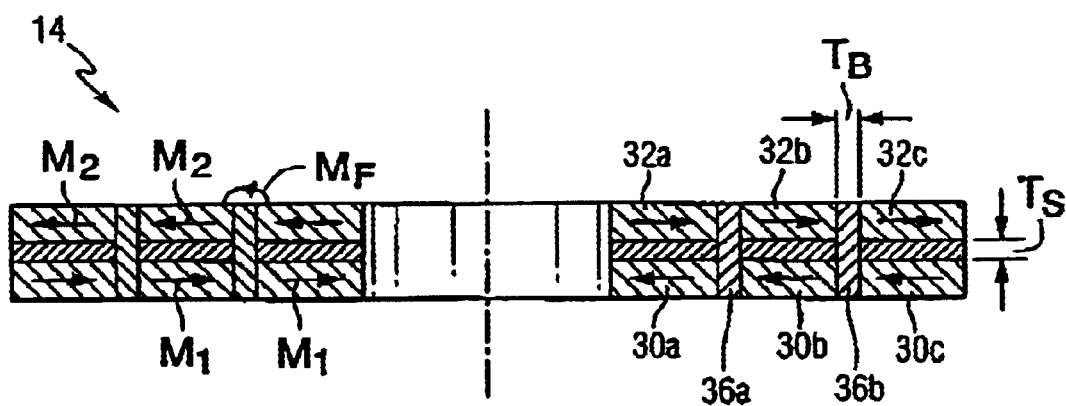
FIG. 4 is a partially schematic side sectional view of a laminated magnetically soft underlayer of a perpendicular recording disk, illustrating concentric rings of magnetically soft layers separated by non-magnetic bands in accordance with an embodiment of the present invention.

Since the aspect ratio of the disk radial size to the film thicknesses is very high, dividing the soft underlayer into a series of concentric bands may improve the effectiveness of the biasing. A partially schematic top view of a laminated soft magnetic underlayer 14 of a perpendicular magnetic recording disk in accordance with an embodiment of the present invention is shown in FIG. 3. A partially schematic side sectional view of the laminated soft underlayer 14 is shown in FIG. 4. The second magnetically soft layer includes multiple concentric rings 32a, 32b and 32c. As shown most clearly in FIG. 4, the first magnetically soft layer includes multiple concentric rings 30a, 30b and 30c. The non-magnetic spacer layer 34 is also divided into concentric rings. Concentric non-magnetic bands 36a and 36b separate the rings of the first and second magnetically soft layers. Thus, the non-magnetic band 36a separates the rings 30a and 30b of the first magnetically soft layer, and also separates the rings 32a and 32b of the second magnetically soft layer. The non-magnetic band 36b separates the rings 30b and 30c of the first magnetically soft layer, and also separates the rings 32b and 32c of the second magnetically soft layer.

As shown in FIG. 4, the non-magnetic separator layer 34 is applied on, and may be coextensive with, the rings 30a, 30b and 30c of the first magnetically soft layer. Similarly, the rings 32a, 32b and 32c of the second magnetically soft layer are deposited on, and may be coextensive with, the non-magnetic layer 34.

As shown in FIG. 4, each of the non-magnetic bands 36a and 36b has a radial width $T_B$, while the non-magnetic spacer layer 34 has a thickness $T_S$ measured in the axial direction of the soft magnetic underlayer 14. The radial width $T_B$ of the bands 36a and 36b may be substantially larger than the thickness $T_S$ of the non-magnetic separator layer 34. For example, the ratio of $T_B:T_S$ may be greater than 2:1, typically greater than 10:1.

As shown in FIG. 4, the magnetization $M_1$ of the concentric rings 30a, 30b and 30c of the first magnetically soft layer is anti-parallel to the magnetization $M_2$ of the concentric rings 32a, 32b and 32c of the second magnetically soft layer. Thus, an opposed radial magnetic field is generated in the laminated soft magnetic underlayer 14. In accordance with an embodiment of the present invention, magnetic fringing fields $M_F$ may be generated between the adjacent concentric rings 32a, 32b and 32c due to the presence of the non-magnetic bands 36a and 36b. The fringing fields $M_F$ may optionally be used for servo tracking purposes during recording operations. For example, such a subdivision of the soft underlayer can be utilized in servo designs where the read-element may sense the narrow regions that separate the soft underlayer bands, e.g., by sensing the fringing fields $M_F$.

The size, shape and magnetic characteristics of the concentric magnetic rings 30a–c and 32a–c and non-magnetic bands 36a and 36b shown in FIGS. 3 and 4 may be selected as necessary in order to provide a sufficient noise-reducing magnetic field radially through the soft underlayer. For example, the radial width of each magnetically soft ring 30a–c and 32a–c may typically range from several microns to several millimeters. The radial width $T_B$ of each non-magnetic band 36a and 36b typically ranges from about 0.5 to about 10 micron.

Although continuous concentric circular magnetically soft rings 30a–c and 32a–c and non-magnetic bands 36a and 36b are shown in FIGS. 3 and 4, other geometries may be used as long as a sufficient magnetic field is generated in the soft underlayer. For example, the rings could be broken into sectors, or other types of patterned media may be provided. Although three sets of concentric magnetically soft rings 30a–c and 32a–c are shown in FIGS. 3 and 4, any suitable number of rings may be used, e.g., one, two, three, four, etc.

The first and second magnetically soft underlayers 30a–c and 32a–c may be anisotropic, for example, with their easy axes aligned along the radius of the disk. The magnetostatic coupling fields $M_1$, $M_2$ generated through each layer 30a–c and 32a–c may be in excess of 5 Oe, for example, in excess of 50 Oe.

To achieve radial anisotropy in each magnetically soft layer 30a–c and 32a–c, several approaches can be used. Deposition in an external radial magnetic field (field induced anisotropy) may be used. Magnetostriction may be used if the soft layer films are deposited on an appropriate underlayer that would induce radially aligned stress in the soft layer films. Post-deposition annealing of the layers in a radially aligned magnetic field may also be used.

In accordance with an embodiment of the present invention, radially aligned magnetization improves dynamic properties of the soft underlayer and reduces Barkhausen noise since the magnetization switching during the write process inside the soft underlayer will follow magnetization rotation rather than domain wall motion, which is known to be faster and less noisy.

The present recording media may be manufactured using conventional media tools. The structures of the disk may be of macroscopic sizes and may not require complicated lithography. Deposition of the soft magnetic underlayer features on a disk substrate may be accomplished by first depositing the non-magnetic bands by, e.g., standard lithography techniques, followed by sequential sputter deposition of the layers 30a–c, 34 and 32a–c, and then chemical mechanical polishing. Alternatively, the layers 30a–c, 34 and 32a–c may be deposited sequentially by, e.g., sputtering, followed by removal of the band areas. The band areas may optionally be filled with non-magnetic material by sputtering or the like. Standard techniques for making patterned media, such as stamping, may also be used.

The following example is intended to illustrate various aspects of the present invention, and is not intended to limit the scope of the invention.

EXAMPLE

Perpendicular media were fabricated with identical Co/Pd multilayer recording layers with either a single layer FeAlN soft underlayer or a laminated soft underlayer comprising two soft magnetic layers separated by thin non-magnetic layer (FeAlN/Ta/NiFe). Auto-correlation signal to noise ratio (SNR) using pseudo-random sequence of bits covering a spectral range from up to 200 kfci was measured for both media with laminated and single layer soft underlayer. An increase in SNR of 4 dB was observed in going from the single layer soft underlayer media (~12 dB) to the FeAlN/Ta/NiFe laminated soft underlayer media (~16 dB). Since the recording layers in both cases were identical and the soft underlayer noise usually manifests itself at lower recording densities (up to ~100 kfci), the boost in SNR is attributed to the reduction of soft underlayer noise by the laminated underlayer.

The present invention substantially suppresses soft underlayer noise, thus resolving one of the major problems in implementing perpendicular magnetic recording systems. In addition, the dynamic properties of the soft underlayer are improved. The biasing scheme is based on spontaneous alignment of the magnetization in the soft underlayer due to magnetostatic interaction between the magnetic layers separated by the thin non-magnetic spacer layer. In addition, the multi-band feature of the suggested soft underlayer design can be utilized in servo systems.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording medium comprising:

a hard magnetic recording layer; and a soft magnetic underlayer under the hard magnetic recording layer, wherein the soft magnetic underlayer comprises means for generating a noise-reducing reducing magnetic field in the soft magnetic underlayer.

2. The perpendicular magnetic recording medium of claim 1, wherein the soft magnetic underlayer comprises first and second magnetically soft layers separated by a non-magnetic spacer layer.

3. A laminated soft magnetic underlayer of a perpendicular magnetic recording medium, the laminated soft magnetic underlayer comprising first and second layers of magnetically soft material separated by a non-magnetic spacer layer which generate a noise-reducing magnetic field in the soft magnetic underlayer.

4. The laminated soft magnetic underlayer of claim 3, wherein the first and second magnetically soft layers comprise at least one alloy selected from CoFe, FeAlN, NiFe, CoZrNb, CoNiFe and FeTaN alloys.

5. The laminated soft magnetic underlayer of claim 3, wherein the first and second magnetically soft layers each have a thickness of from about 5 to about 100 nm.

6. The laminated soft magnetic underlayer of claim 3, wherein the non-magnetic spacer layer comprises at least one oxide, nitride or carbide.

7. The laminated soft magnetic underlayer of claim 3, wherein the non-magnetic spacer layer comprises at least one material selected from $SiO_2$, MgO, BN, CN, $B_4C$ and SiC.

8. The laminated soft magnetic underlayer of claim 3, wherein the non-magnetic spacer layer comprises at least one metal selected from Ta, Cu and Au.

9. The laminated soft magnetic underlayer of claim 3, wherein the non-magnetic spacer layer has a thickness of from about 0.5 to about 20 nm.

10. The laminated soft magnetic underlayer of claim 3, wherein the first and second magnetically soft layers are ring shaped.

11. The laminated soft magnetic underlayer of claim 10, wherein the first and second magnetically soft layers comprise a plurality of concentric rings.

12. The laminated soft magnetic underlayer of claim 11, wherein the concentric rings are separated by non-magnetic bands.

13. The laminated soft magnetic underlayer of claim 12, wherein the non-magnetic bands have radial widths of from about 0.5 to about 10 micron.

14. The laminated soft magnetic underlayer of claim 12, wherein magnetic fringing fields are generated across the non-magnetic bands between adjacent concentric rings of the second magnetically soft layer.

15. The laminated soft magnetic underlayer of claim 10, wherein the magnetic field generated in the soft magnetic underlayer comprises an opposed radial magnetic field generated through the first and second magnetically soft layers.

16. The laminated soft magnetic underlayer of claim 3, wherein the magnetic field generated in the soft magnetic underlayer is greater than about 5 Oe.

17. The laminated soft magnetic underlayer of claim 3, wherein the magnetic field generated in the soft magnetic underlayer is greater than about 50 Oe.

18. The laminated soft magnetic underlayer of claim 3, wherein the underlayer comprises from two to twenty magnetically soft layers each separated by a non-magnetic spacer layer.

19. A method of making a laminated magnetically soft underlayer of a perpendicular magnetic recording disk, the method comprising:

depositing a first magnetically soft layer on a substrate disk;

depositing a non-magnetic layer on the first magnetically soft layer;

depositing a second magnetically soft layer on the non-magnetic layer; and generating a noise-reducing magnetic field in the soft magnetic underlayer.

20. The method of claim 19, further comprising depositing a magnetically hard recording layer on the magnetically soft underlayer.

* * * * *

UNITED STATES PATENT AND TRADEMARK OFFICE
CERTIFICATE OF CORRECTION

PATENT NO. : 6,660,357 B1
DATED : December 9, 2003
INVENTOR(S) : Dmitri Litvinov et al.

It is certified that error appears in the above-identified patent and that said Letters Patent is hereby corrected as shown below:

<u>Title page,</u>
Item [56], References Cited, U.S. PATENT DOCUMENTS, "5,907,790" should read -- 5,907,690 --.
OTHER PUBLICATIONS, "Transacitons" should read -- Transactions --.

Signed and Sealed this

Tenth Day of August, 2004

JON W. DUDAS
*Acting Director of the United States Patent and Trademark Office*